(12) United States Patent
Fischer

(10) Patent No.: US 8,474,881 B2
(45) Date of Patent: Jul. 2, 2013

(54) SHEET METAL CORNER FOR DUCT FLANGES

(75) Inventor: Herbert J. Fischer, Imperial, MO (US)

(73) Assignee: H J Fischer, LLC, Imperial, MO (US)

( * ) Notice: Subject to any disclaimer, the term of this patent is extended or adjusted under 35 U.S.C. 154(b) by 0 days.

(21) Appl. No.: 13/440,845

(22) Filed: Apr. 5, 2012

(65) Prior Publication Data

US 2012/0248768 A1 Oct. 4, 2012

Related U.S. Application Data

(63) Continuation of application No. 12/466,632, filed on May 15, 2009, now Pat. No. 8,172,280.

(60) Provisional application No. 61/053,772, filed on May 16, 2008.

(51) Int. Cl.
*F16L 25/00* (2006.01)

(52) U.S. Cl.
USPC .......................................... 285/424

(58) Field of Classification Search
USPC ................................ 285/424, 405
See application file for complete search history.

(56) References Cited

U.S. PATENT DOCUMENTS

| | | | | | |
|---|---|---|---|---|---|
| 4,410,206 | A | * | 10/1983 | Mez | 285/405 |
| 4,466,641 | A | * | 8/1984 | Heilman et al. | 285/424 |
| 4,572,553 | A | * | 2/1986 | Geldner | 285/424 |
| 4,579,375 | A | * | 4/1986 | Fischer et al. | 285/424 |
| 4,662,661 | A | * | 5/1987 | Arnoldt | 285/424 |
| 5,069,484 | A | * | 12/1991 | McElroy | 285/424 |
| 5,165,730 | A | * | 11/1992 | McElroy | 285/424 |
| 5,321,880 | A | * | 6/1994 | Goodhue | 29/509 |
| 5,342,100 | A | * | 8/1994 | Goodhue | 285/424 |
| 5,564,758 | A | * | 10/1996 | Tiberio | 285/405 |
| 6,412,519 | B1 | * | 7/2002 | Goodhue | 285/424 |
| 6,428,056 | B1 | * | 8/2002 | Issagholian-Havai | 285/405 |
| 6,547,287 | B1 | * | 4/2003 | Shah et al. | 285/405 |

* cited by examiner

*Primary Examiner* — David E Bochna
(74) *Attorney, Agent, or Firm* — Matthews Edwards LLC

(57) ABSTRACT

A corner flange connection member for joining flanges of duct sections, includes two leg portions joined together in an angular relationship by a corner portion, the connection member being substantially flat and including at least one opening for receiving a fastening member having a threaded portion, the threaded portion having a root diameter, the opening being defined by two joined and offset partially rounded openings, at least one of the offset partially rounded openings having a sectional extent between opposite sides thereof about equal to the root diameter of the threaded portion of the fastening member, the offset being about equal to a thread height of threads of the threaded portion of the fastening member, and the sides of the offset openings being joined generally tangentially. The opening or openings can be located in the corner portion or one or both of the leg portions.

8 Claims, 10 Drawing Sheets

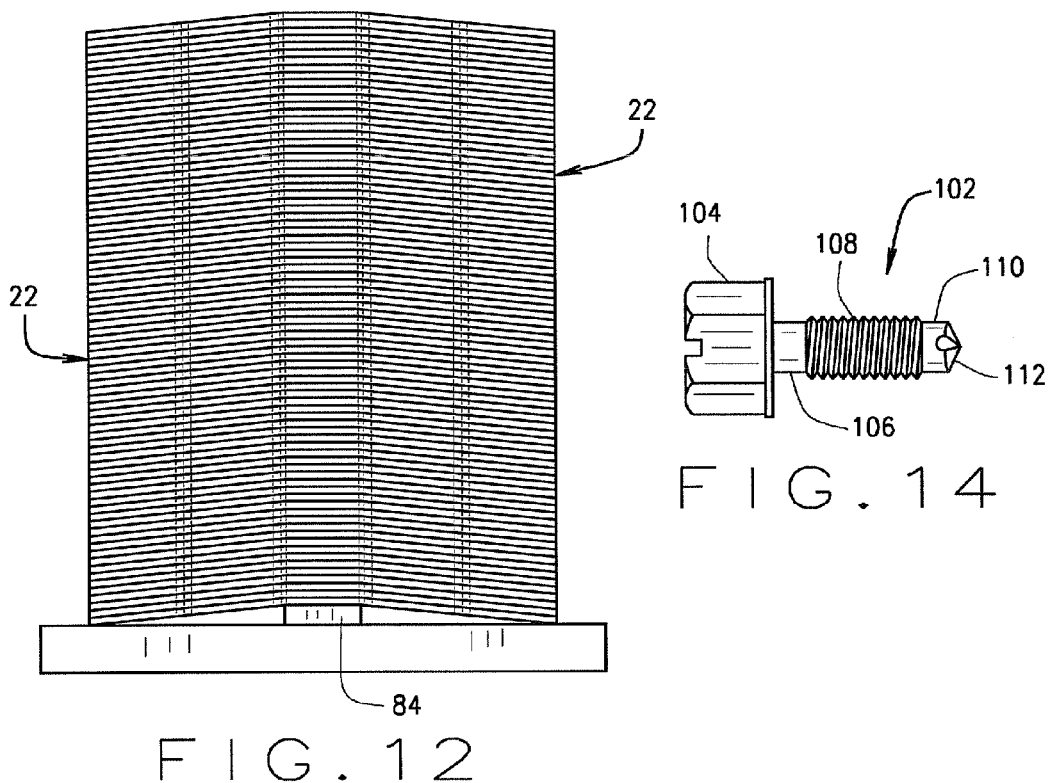
FIG. 12
FIG. 14
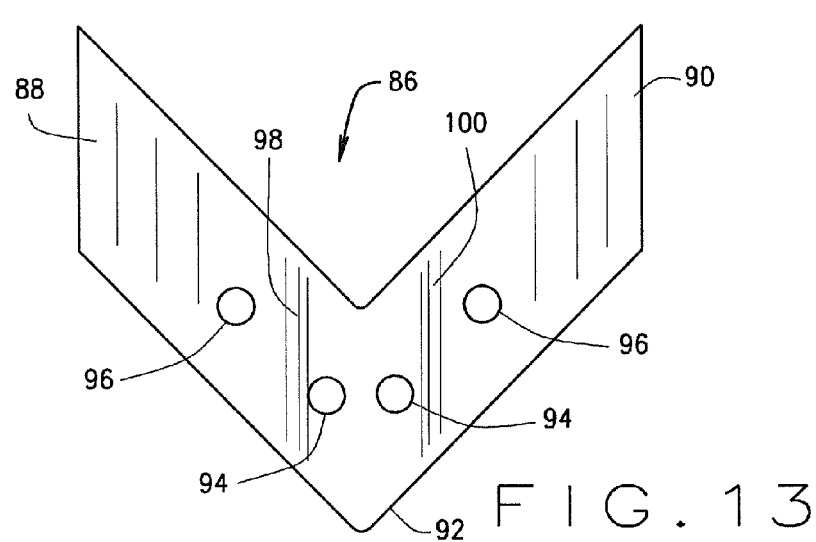
FIG. 13

SHEET METAL CORNER FOR DUCT FLANGES

CROSS REFERENCE TO RELATED APPLICATIONS

This application is a continuation of U.S. Pat. application Ser. No. 12/466,632, filed May 15, 2009, now U.S. Pat. No. 8,172,280, dated May 8, 2012, which is a non-provisional application claiming priority to provisional Patent Application Ser. No. 61/053,772 filed May 16, 2008, each of which is incorporated herein by reference in its entirety.

BACKGROUND OF INVENTION

The present invention relates generally to duct assemblies for transporting pressurized fluid in buildings such as ductwork for HVAC systems and, more particularly, to various embodiments of a corner flange connection member for placement into corners defined by channel flanges associated with HVAC and other types of ductwork and the method for attaching such corner flange connection members to the ductwork channel flanges including certain improved high speed fastener connectors.

Duct assemblies used to transport pressurized fluid in buildings such as forced air HVAC systems are conventionally formed in sections and secured together to form longer spans as needed. A duct section is typically formed of sheet metal into a rectangular shape having four sides and vent or seamed corners at the intersections of the sides. A flange extends essentially perpendicularly outward from each side at both ends of the duct section. Duct sections are positioned end-to-end such that the flanges of one duct section align with the flanges of an adjacent duct section and the aligned duct flanges are fastened together to form the overall duct assemblies. The flanges which are formed as part of each duct section are not continuous. Rather, there are gaps at each location on the duct sections where adjacent flanges meet for manufacturing convenience. These typically occur at the four corners of the top and bottom sections of a particular duct section. Corner pieces or corner flange connectors are typically inserted into channels formed in each duct flange such that they span the corner gap at each location on the duct section where adjacent flanges meet. When the duct sections are positioned end-to-end, the corner pieces of one duct section are aligned with corner pieces of the adjacent duct section. Fasteners are then inserted through holes extending through the corner pieces to clamp the duct sections together. Typically, a single bolt with a washer and nut are used to complete the duct flange connector. Frequently, gaskets are placed between aligned duct flanges to achieve an airtight seal and clips or screws are used to hold the aligned flanges together between the corner pieces.

One typical corner flange connector or angle plate is disclosed in U.S. Pat. No. 5,342,100 wherein the angle plate is pressed into duct channel flanges which are formed with return side wall bends at their free ends to hold the angle plate in the duct channel flange when the return side wall bends of the flanges are crimped over such angle plate. This angle plate likewise includes upstanding projections or the equivalent thereof projecting in a common direction and being of a height to hold adjacent plates parallel and spaced apart from each other when stacked one on top of the other thereby preventing nesting and permitting the sliding of single plates off the bottom of a stack of plates for use in an apparatus for automatically installing angle plates at the corners of ductwork. This snap or pressing connection of the corner plate into the duct channel flange does not always produce a completely secure connection, even when crimping is used. Not only does this technique allow the corner plates to become separated from the flanges more easily, it also allows adjacent flanges of the duct assembly to move independently of each other. If the corner plates move independently from the flanges, adjacent flanges of the duct assembly can likewise move independently from each other permitting the duct sections to move with respect to each other thereby allowing fluid or air to leak from between the joints. If these corner plates become loose or actually separate from the flanges, additional time is required to reinsert and fasten the corner pieces in the appropriate duct channel flanges and to reattach the adjacent duct sections. A corner flange connection member which achieves a more robust connection and which is easier to install is desirable.

Another known corner member and method for connecting adjacent duct assemblies is disclosed in U.S. Pat. No. 6,471,256. This corner flange connection member requires no pressing or crimping and utilizes nuts and bolts to complete the connection. The joint is formed by passing standard fasteners through a corner flange connection member associated with one duct section, through integral channel flanges associated with the adjacent duct sections which are arranged in end-to-end relationship to each other, and through a corner flange connection member associated with the other duct section. The act of installing the fasteners tightly pulls together the duct flanges and makes an integral connection between them. The use of machine screws, without nuts, which bite into the material of the duct flange when driven through holes associated with the respective arm portions of the connector member and through pre-formed holes associated with the duct flanges thereby forming a threaded inner connection therebetween is likewise disclosed.

Still further, as likewise disclosed in U.S. Pat. No. 6,472,256, corner plates can also be attached to the duct channel flanges by deforming material of the duct flanges through pre-formed holes associated with the corner plates. In this instance, no screws, nuts or bolts are utilized in the joinder method. Other connector member configurations and methods for attaching adjacent duct sections together are likewise disclosed in U.S. Pat. No. 6,471,256. Although all of these corner members and connection techniques improve the stability and rigidity of connecting adjacent duct sections, an easier, faster, and more efficient method for making such connections as well as use of a corner flange connection member which applies greater clamping force to the duct flanges is desirable. In addition, use of a corner flange connection member, improved fasteners and a method of attaching adjacent duct sections which can accommodate for damage and/or malformation/misalignment occurring to the duct channel flanges during manufacturing, transportation and/or assembly without the need for extensive and expensive corrective measures is likewise desirable.

Accordingly, the present invention is directed to overcoming one or more of the problems as set forth above.

SUMMARY OF INVENTION

The present invention relates to various embodiments of an improved high speed corner flange connection member which is specifically shaped and designed to increase the clamping force applied to adjacent duct flanges when adjacent duct sections are connected together, and which corner flange connection members are both nestable and slidable for use with automated corner installing machines such as those made by Iowa Precision Industries, Lockformer, and others.

The present corner flange connection members include a pair of integrally formed leg portions which are bowed or otherwise bent such that when the corner flange connector member is initially positioned within the duct channel flange, only portions of the corner flange connection member rest upon the duct channel flange while other portions are spaced from or elevated above the duct channel flange so as to form a spring-type biasing action when a pair of opposed corner flange connection members are drawn together by the action of the fastening members as will be hereinafter explained. The pair of leg members are joined together at right angles to form an L-shaped member, the intersection of the leg members forming a corner portion of the connection member. In one embodiment, the corner portion includes a pair of openings, one opening being larger than the other opening, one opening being characterized as a clearance hole while the other opening is characterized as a tap hole or a threadable hole. In another embodiment, the openings associated with the corner portion are of a similar diameter.

The corner portion of the present corner flange connection member likewise includes a pair of spaced apart creases or bends from which the leg portions are bent thereby allowing the corner portion to remain relatively flat while allowing the respective leg portions to be angularly oriented relative thereto. This configuration establishes the bowed portion of the present corner flange connection member and enables the present corner flange member to apply a greater clamping pressure to the duct channel flanges as adjacent duct sections are fastened together. In this regard, the corner flange connection member associated with the duct channel flange of one of the adjacent duct sections will be positioned and oriented relative to the corner flange connection member positioned within the duct channel flange of the adjacent duct section such that, in one embodiment, the clearance hole of one corner flange connection member will be aligned with the tap hole associated with the opposed corner flange connection member of the adjacent duct section. As a result, the act of installing and threading a fastener member through an aligned clearance hole and tap hole associated with opposed corner flange connection members will tightly pull together the adjacent duct channel flanges and will apply a clamping force to such duct channel flanges as the fastening member is threaded therethrough without the use of the conventional bolt, nut and washer combination. The bowed configuration of the present corner flange connection member applies a greater clamping force to the adjacent duct sections as compared to the known corner members or angle plates for reasons which will be hereinafter explained. In this regard, the tap hole associated with the corner portion of the present corner flange connection member is sized so as to receive a pilot portion associated with the fastener member but which hole is smaller than the threaded portion of the fastener member. In contrast, the clearance hole is sized and shaped so as to be larger than the threaded portion of the fastener member. As a result, as the fastener member is driven first through the aligned clearance hole and then through the aligned tap hole associated with adjacent opposed corner flange connection members, the fastener member will first pass completely through the clearance hole of the first corner flange connection member and will bite into the material associated with the opposed corner flange connection member surrounding the tap hole. This action forms a threaded inner connection therebetween drawing the second corner member towards the first corner member. As the fastener member is driven through the corner members, the adjacent duct sections are likewise driven together by the action of the fastener member into a tight substantially sealing relationship at the joint between the duct sections. Since the tap hole is smaller than the threaded portion of the fastening member, the fastening member will bite more deeply into the material associated with that particular corner flange connection member thereby tightly drawing the two corner connection members into sealing engagement with each other. If necessary, a second fastening member can be threaded through the respective corner portions of adjacent corner flange connection members associated with adjacent duct sections from the opposite side thereof thereby further securing the corner flange connection members to the adjacent duct sections. Small duct sections can be held with one fastening member, while larger duct sections can use two or more fastening members.

In those applications where additional strength and rigidity is required, the respective leg portions associated with the present corner flange connection members may likewise include optional holes for receiving additional fasteners for clamping the duct channel flanges therebetween. In one embodiment, one leg portion may include a clearance hole while the other leg portion would include a tap hole. In this particular configuration, aligned pairs of corner flange connection members will be positioned within adjacent duct channel flanges such that a clearance opening associated with the leg portion of one of the opposed pairs of connector members will be positioned in alignment with the tap hole associated with the leg portion of the other opposed connector member. In still another embodiment, the openings associated with the respective leg portions may be of the same diameter or other shape such as rectangular or square. Regardless of whether clearance openings and tap openings are utilized in a particular embodiment, or whether the openings associated with the corner portion and leg portions are of similar diameters or other similar shapes, a strong tight connection between adjacent duct sections is achieved through the use of the high speed fasteners associated with the present invention as will be hereinafter explained, and through the application of a greater clamping force to the duct channel flanges sandwiched therebetween due to the bowed configuration of such corner flange connection members.

In still other embodiments of the present corner flange connection member, the bowed configuration of such corner members can be eliminated and such corner flange connection members can be made so as to be substantially flat or planar. In this particular configuration, in one embodiment, the corner portion of such connector members may include a clearance hole and a tap hole as previously explained, and one leg portion may include a clearance hole while the other leg portion includes a tap hole.

In still another embodiment, the openings associated with the corner portion of a substantially flat or planar corner member may be of the same diameter or other shapes, and the openings associated with the respective leg portions may be of the same or a different similar diameter or other shapes. In this regard, a rectangular opening, an oblong opening or other shaped opening may also be used. In these particular embodiments, a strong tight sealing connection between adjacent duct sections is achieved through the use of aligned clearance holes with tap holes, and/or through the use of the high speed fastener members associated with the present invention as will be hereinafter further explained.

Still further, although no pressing is required for initially inserting any of the present corner flange connection members within the respective duct channel flanges, the present connection members are sized and shaped so that crimping of the adjacent duct channel flanges onto the present corner flange connection members is likewise possible to further strengthen the joinder therebetween. Since the present corner flange connection members are substantially smooth and do not include upstanding side walls or any projections or protrusions similar to the projections associated with the angle plate disclosed in U.S. Pat. No. 5,342,100, the present corner flange connection members are both stackable and nestable within an automated corner plate installing machine and such corner flange connection members are likewise easily slidable from the bottom of a stack for use with such automated corner machines. In addition, since the present corner members include no upstanding side walls or side flanges, crimping is substantially easier since only the side wall of the duct channel flange need be crimped.

Still further, although traditional sheet metal screws or standard nuts and bolts can be used in clamping together adjacent duct sections, the present invention also includes the use of high-speed connector members in the form of a piloted self-tapping bolt, a piloted bolt in combination with a standard nut, a standard bolt or carriage bolt in combination with a piloted nut or piloted washered nut, a piloted self-tapping bolt with a relief portion between the head and threaded portion, a piloted carriage bolt in combination with a piloted nut, and a special sheet metal fastener, all of which provide improved drawing action. Each of these high-speed fastening connectors greatly improves the time required to accomplish the joinder and eliminates the use of clumsy hex nuts and washers. These improved fastening members likewise substantially eliminate cross-threading and misalignment of the nut and bolt combination and, importantly, all of these fastening members can be quickly inserted through the use of a battery powered drill or other power tool.

BRIEF DESCRIPTION OF DRAWINGS

For a better understanding of the present invention, reference may be made to the accompanying drawings.

FIG. 12 is a side elevational view showing the corner elements of FIGS. 2 and 3 in a stackable/nestable arrangement in a typical corner installing machine.

FIG. 13 is a top plan form view of another embodiment of a corner element constructed in accordance with the teachings of the present invention.

FIG. 14 is still another embodiment of a high speed fastener member for use with the present corner elements constructed in accordance with the teachings of the present invention.

DETAILED DESCRIPTION

Figure 1:
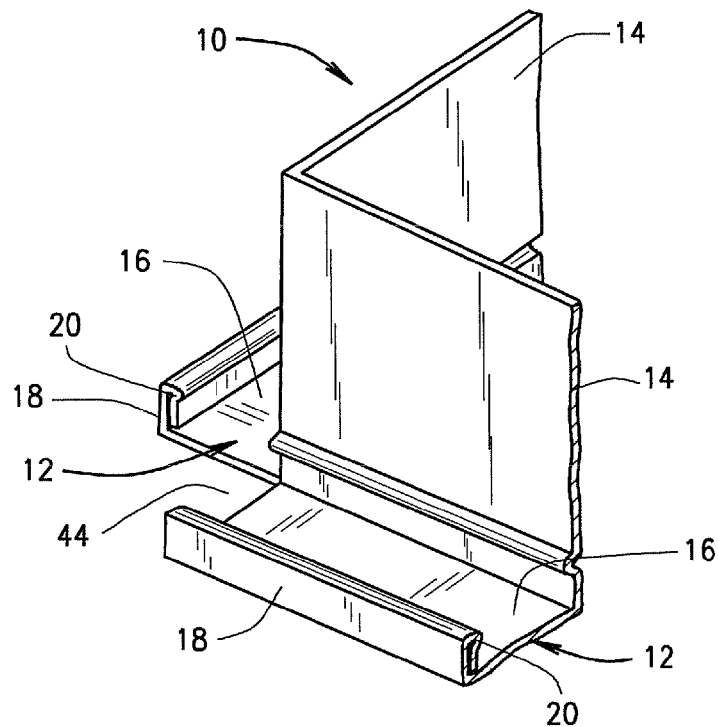
FIG. 1 is a partial perspective view of a typical corner portion of a duct section having duct channel flanges into which the present corner flange connection members are inserted.

Referring to the drawings wherein like numerals refer to like parts, FIG. 1 illustrates the lower corner of a typical duct section 10 and shows the specific details of the duct channel flange 12 formed at opposite ends of the duct panels 14. Each duct channel flange 12 includes a base member 16 which extends transversely outwardly from each end portion of each duct panel 14. The base member 16 terminates in a side wall or side flange 18 which extends parallel to the respective duct panels 14 and may be selectively doubled inwardly or outwardly upon itself to form a return bend 20 at its free end. The duct channel flanges 12 are adapted to receive the various embodiments of the corner flange connection members of the present invention as illustrated in FIGS. 2-5, 13, 16 and 17.

Figure 2:
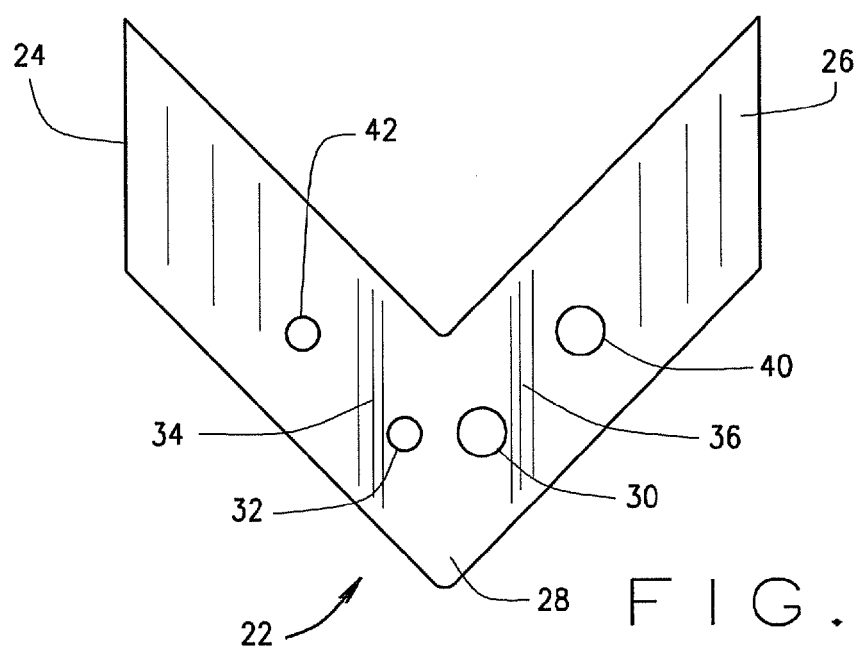
FIG. 2 is a top plan form view of one embodiment of the present corner elements constructed in accordance with the teachings of the present invention.
Figure 3:
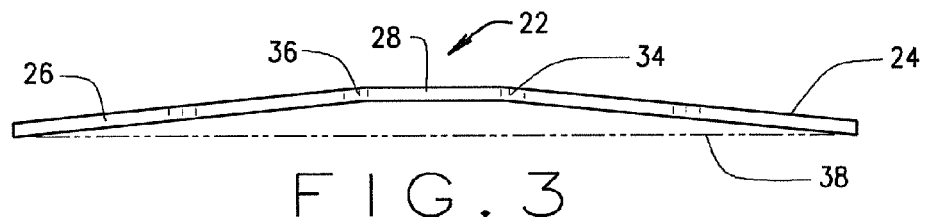
FIG. 3 is a front elevational view of the corner element of FIG. 2.

FIG. 2 illustrates one embodiment 22 of the present corner flange connection member or corner element which is basically L-shaped in configuration and includes a pair of integrally formed leg portions 24 and 26. The leg portions 24 and 26 are integrally joined together and intersect at right angles at corner portion 28. Corner portion 28 includes a pair of spaced-apart openings 30 and 32, opening 30 being larger in diameter than opening 32, opening 30 being characterized as a clearance hole while opening 32 is characterized as a tap hole. In this regard, as will be hereinafter further explained, the clearance hole 30 is of a diameter greater than the diameter of the threaded portion of the fastening member positioned therethrough for joining adjacent duct sections as will be hereinafter explained whereas, to the contrary, tap hole 32 is of a diameter smaller than the diameter of the threaded portion of the fastening member utilized to connect adjacent duct sections. In addition, the corner portion 28 of the present corner flange connection member 22 likewise includes a pair of spaced creases or bends 34 and 36 wherein the respective leg portions 24 and 26 extending away from the creases 34 and 36 towards their respective terminal end portions are bent or angularly deflected about such creases downwardly as best illustrated in FIG. 3. The bent or angularly deflected leg portions 24 and 26 present a bowed shaped connection member when positioned on a substantially flat or planar surface as illustrated in FIG. 3 wherein the corner portion 28 remains relatively flat and substantially parallel to a corresponding planar surface such as the surface 38 illustrated in FIG. 3, and the corresponding leg portions 24 and 26 are angularly oriented or bent downwardly along creases 34 and 36 as likewise best illustrated in FIG. 3. This bowed configuration supplies a clamping pressure to the duct channel flanges when a pair of duct sections are joined together in end-to-end relationship as will be hereinafter further explained. It is also recognized that the creases or bends 34 and 36 may be located anywhere along the length of each respective leg portion 24 and 26 such that at least a portion of each leg portion extending away from its respective crease or bend will be bent or angularly deflected about such crease or bend as explained above. Still further, it is also recognized that the entire corner flange connection member 22 may be one continuous curve or bow such that the corner portion 28 no longer remains substantially flat and the creases or bends 34 and 36 merge at the center of corner portion 28 and the corner portion 28 forms one continuous curve or bend with leg portions 24 and 26. As best seen in FIG. 3, this embodiment would have corner portion 28 slightly bowed between the creases 34 and 36. The key to this aspect of the present invention is the bowed, curved or arc configuration of the corner flange connection member 22, however such bowed configuration is achieved.

Still further, the leg portions 24 and 26 of the present corner flange connection member 22 may likewise each include a respective opening 40 and 42 as illustrated in FIG. 2. Here again, opening 40 is characterized as a clearance opening and would have a diameter greater than the diameter of the threaded portion of the fastening member positioned therethrough, and opening 42 is characterized as a tap hole and would have a diameter smaller than the diameter of the threaded portion of the fastening member positioned therethrough as likewise will be hereinafter further explained. The openings 40 and 42 are optional and may be utilized to add additional strength and stability to the joinder of two duct sections as will be hereinafter further explained.

Figure 4:
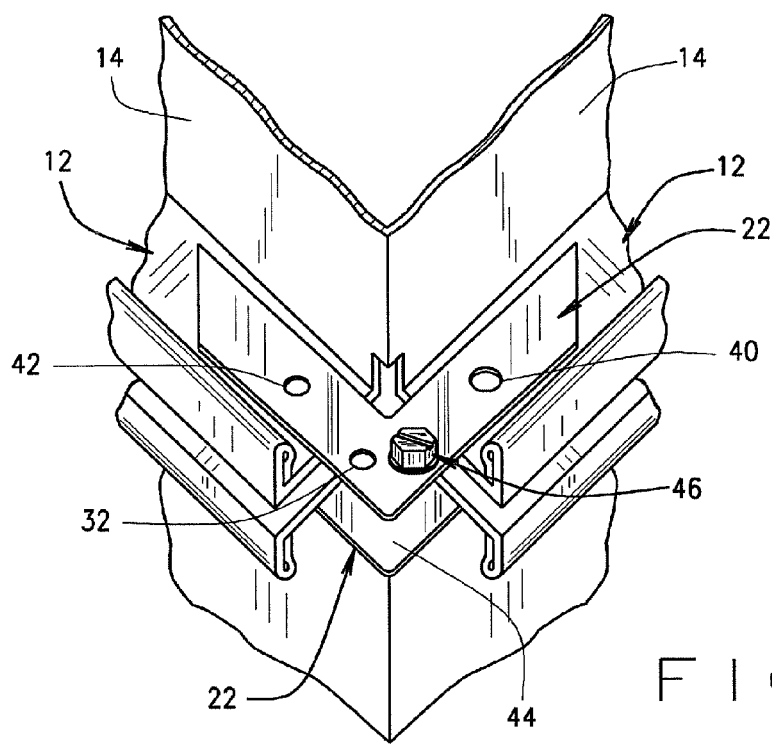
FIG. 4 is a partial perspective view of a pair of duct sections joined together using the corner element of FIGS. 2 and 3.
Figure 5:
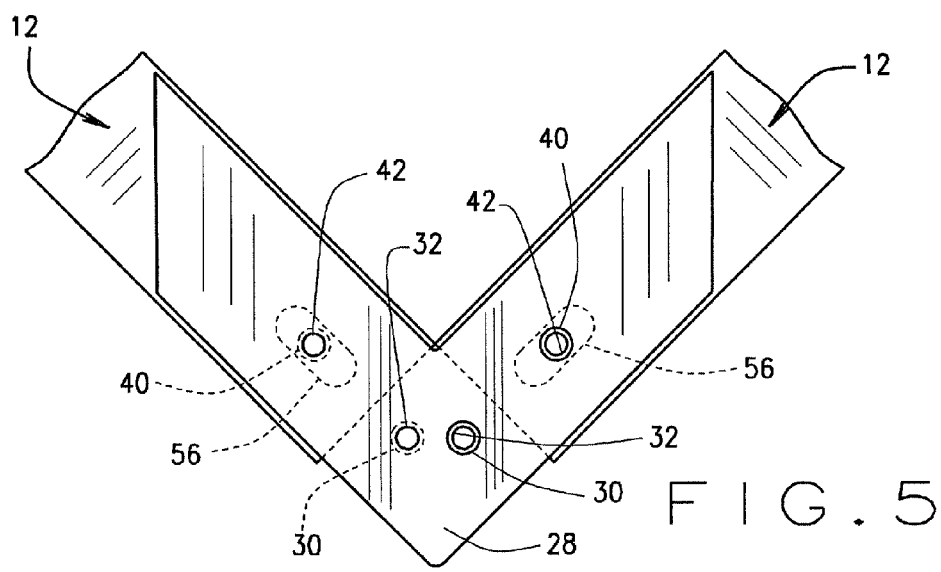
FIG. 5 is a partial top plan form view of a pair of the connector elements of FIGS. 2 and 3 positioned within adjacent duct channel flanges showing the alignment of the respective holes associated therewith including use of a slot associated with each duct channel flange to address misalignment issues.
Figure 6:
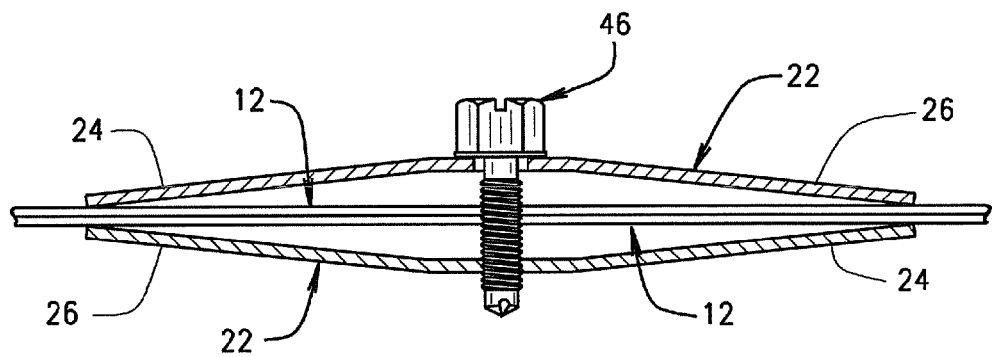
FIG. 6 is a front elevational view of a pair of the present connector elements of FIGS. 2 and 3 positioned within aligned duct channel flanges showing the bowed configuration of the corner elements.

FIGS. 4-8 illustrate the joinder of two duct sections 10 for transporting pressurized fluid assembled using the corner flange connector members 22 described above. The duct sections 10 are positioned in end-to-end relationship as shown such that the duct channel flanges 12 extending outwardly from the respective ends of the duct panels 14 face each other thereby defining aligned duct channel flange pairs such that the corners and sides of the duct sections are aligned. As best shown in FIG. 1, at each corner of the duct sections 10 there is formed by the duct channel flanges 12 a square notch or opening 44. The duct assembly illustrated in FIG. 4 is fastened together through the use of a pair of corner flange connection members 22 positioned within the duct channel flanges 12 at each of the aligned corners of the respective duct sections 10. Each connector pair thereby comprises a pair of separated corner flange connector members 22 spanning adjacent duct flanges 12 of each duct section 10. The pair of corner flange connection members 22 are positioned on opposing faces of each flange pair 12 such that the duct channel flange pair are positioned between the connector elements 22. When the corner flange connector members 22 are initially positioned within the duct channel flanges 12 as illustrated in FIG. 4, such corner flange connector members 12 will be positioned and oriented relative to their respective duct channel flanges as illustrated in FIG. 6. In other words, the opposed connector elements 22 will be bowed as illustrated and only portions of the respective leg portions 24 and 26 will be in initial contact with the respective duct channel flanges 12. In this regard, it is also important to note that the opposed corner connector elements 22 are positioned in opposed relationship to each other such that the clearance hole 30 associated with one connector element 22 will be positioned in alignment with the tap hole 32 associated with the opposed connector element 22. This will enable one or two fastener members to be positioned within the corresponding clearance holes 30 associated with the opposed connector elements 22 for engagement of the duct sections 10 as will be hereinafter further explained. The fastener member will extend through at least one of the aligned openings 30 and 32 extending through each corner element 22 of the pair adjacent the corner of the duct sections 10. The alignment of the respective holes 30 and 32 associated with the opposed connector elements 22 within the corresponding duct channel flanges 12 is illustrated in FIG. 5 and proper alignment will always occur due to the bowed configuration of the corner element 22, that is, so long as the downwardly extending leg portions 24 and 26 are always positioned extending downwardly in the duct channel flange.

Figure 7:
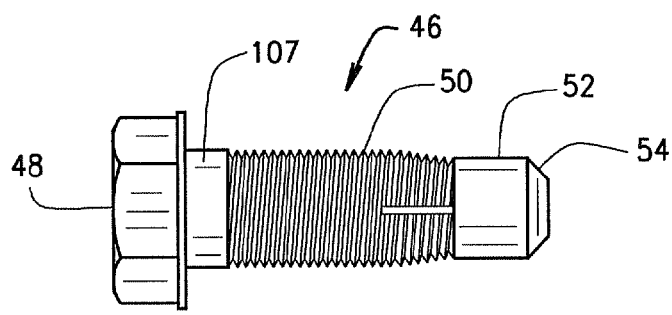
FIG. 7 is a side elevational view of one embodiment of a high speed fastener member for use with the present connector elements constructed in accordance with the teachings of present invention.
Figure 8:
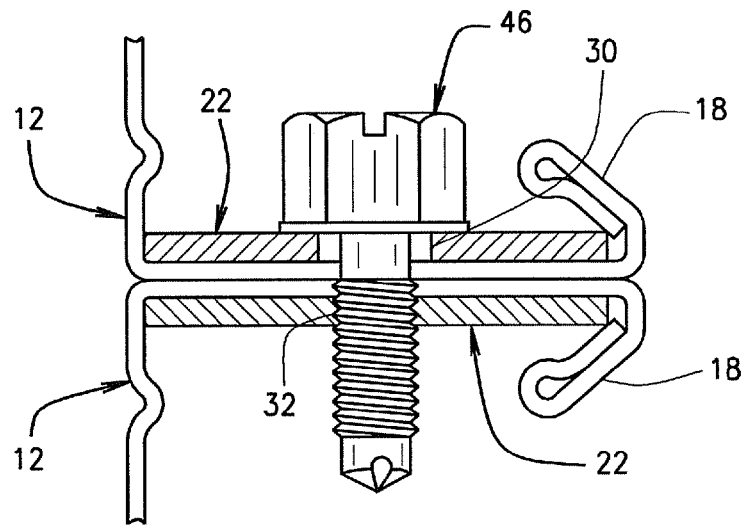
FIG. 8 is a partial front elevational view of the assembly of FIG. 4 showing the fastener member of FIG. 7 inserted and threaded through the aligned clearance and tap holes associated with the corner portion of the corner elements of FIGS. 2 and 3.

Although a conventional fastener member in the form of a conventional nut and bolt fastener can be utilized to quickly join the paired connector elements 22 and the adjacent duct sections 10 in end-to-end relationship, another aspect of the present invention relates to the use of a high-speed connector member in the form of a piloted self-tapping bolt 46 illustrated in FIG. 7. The fastener 46 includes a head portion 48, a threaded portion 50, and a piloted portion 52. The piloted portion 52 does not include threads and includes a beveled tip 54 for guiding and aligning the fastener 46 within a respective opening. In the embodiment illustrated in FIGS. 4, 6 and 8, the fastener 46 is sized and dimensioned in accordance with the diameter of the respective openings 30 and 32 associated with the present corner flange connector member 22. In this regard, as best illustrated in FIG. 8, the fastener 46 is first inserted through the clearance opening 30 associated with one of the opposed connector elements 22. Since the clearance opening 30 has a diameter greater than the diameter of the threaded portion 50 of fastener 46, the fastener 46 will easily slide through the opening 30 in search of the opposed tap opening 32 associated with the other connector element 22. Since the piloted portion 52 of the fastener 46 has a diameter which is less than the diameter of threaded portion 50, and since the piloted portion 52 is of a smaller diameter, the piloted portion 52 of fastener 46 will register with and extend through the corresponding tap opening 32 which is sized to receive the same. However, since the diameter of the tap hole 32 is smaller than the diameter of the threaded portion 50 of fastener 46, the fastener 46 will bite into the material of the corner portion 28 surrounding tap hole 32 as the fastener 46 is driven through the opening 32. This forms a threaded inner connection between the opposed pairs of corner elements 22 as the fastener 46 is driven through the respective aligned openings 30 and 32 and, as the fastener 46 bites into the opposite corner element 22, it will draw the opposed corner elements 22 into engagement with each other. The fastener 46 will pass through the first corner element and will draw the second opposed corner element tightly against it with a consistent force due to the threaded portion 50 clearing the first corner element. Since the integral duct channel flanges 12 associated with adjacent duct sections 10 are sandwiched between the opposed pair of connector elements 22, as the fastener 46 is driven through the openings 30 and 32, both the corner portions 28 of the corner elements 22 as well the duct sections 10 sandwiched therebetween are drawn together by the action of the fastener 46 into a tight sealing relationship at the joint between the duct sections.

Importantly, since the opposed connector elements 22 are bowed as best illustrated in FIGS. 3 and 6, and as explained above, as the fastener 46 is driven through the respective pair of corner elements 22, the corner portions 28 of the opposed corner elements 22 are likewise drawn together by the action of the fastener 46 thereby exerting a clamping or biasing force against the respective duct channel flanges 12 which further serves to form a tight sealing relationship at the joint between the duct sections. The bowed configuration of the opposed corner elements 22 thereby apply a clamping pressure to the duct flanges 12 as the fastener 46 is driven through the respective openings 30 and 32 thereby applying an additional biasing force against the respective duct flanges further enhancing the joinder therebetween. As the fastener 46 is driven through the opposed pair of corner elements 22, the corner portions 28 of each opposed corner element 22 is pressed into a nearly flat condition within its respective duct channel flanges and the respective corner portions 28 are likewise drawn together as illustrated in FIGS. 4 and 8. Depending upon the particular duct application, the use of a single fastener member 46 may be sufficient for certain low pressure HVAC applications. For higher pressure applications, an additional fastener member 46 may be driven through the other aligned pair of openings 30 and 32 associated with the corner portions 28 of the opposed corner elements 22 from the opposite side of the connected corner element pairs if necessary. The spacing between the respective openings 30 and 32 associated with the corner portion 28 of each corner flange connector member 22 is such that fastener member 46 can be driven through an aligned pair of connector elements 22 from opposite sides thereof without interference. In certain applications, the use of one or two fasteners 46 driven through the opposed corner portions 28 will provide sufficient clamping force to hold the aligned duct sections 10 in sealing engagement.

In this regard, it is recognized that each of the four corners of the aligned duct sections 10 would be fastened together using connected pairs of connector elements 22 as described above with respect to FIGS. 4-6 and 8 using fastener member 46. Although other suitable fastening devices may be used in connecting the aligned opposed pairs of connector elements 22 at each duct corner such as sheet metal screws or machine screws (not shown), it is believed that the use of the high-speed fastener member 46 will be more efficient, will require less time for installation, will prevent cross-threading and mis-threading associated with conventional nut and bolt fasteners, and the fasteners 46 can be quickly inserted through the use of a power drill. In this regard, the head portion 48 of the fastener 46 is adapted for use with conventional type power drills. This is not necessarily true with respect to sheet metal screws or machine screws.

As will be understood by those skilled in the art, the fasteners 46 connecting the paired corner elements 22 and the paired duct flanges 12 not only connect the aligned connector pairs 22 but also directly connect adjacent duct flanges 12 of each duct section 10 to each other to significantly strengthen the assembly.

Figure 9:
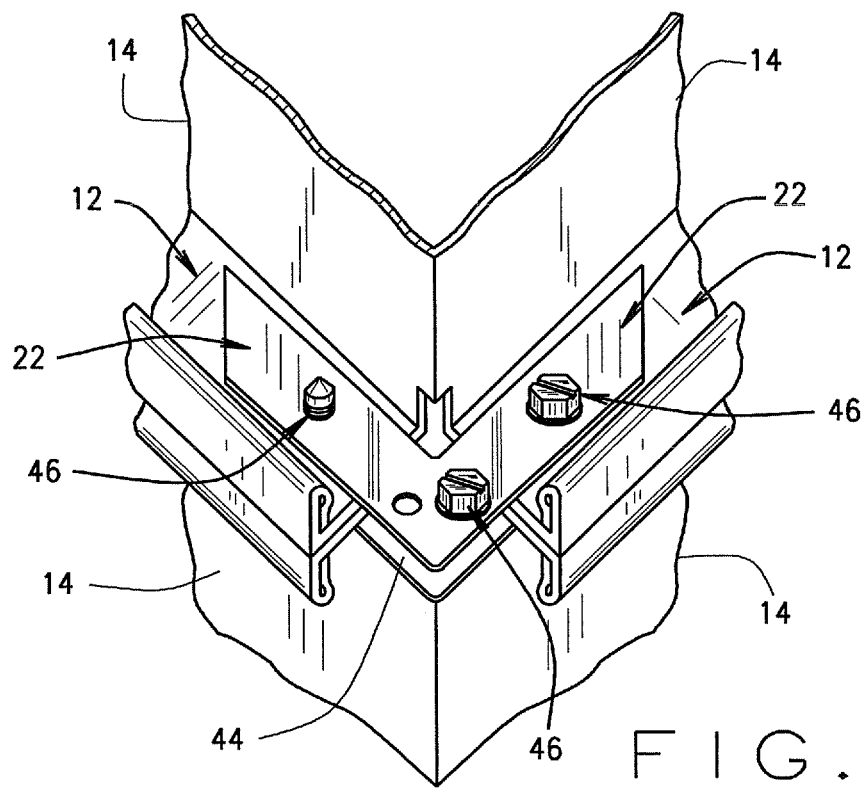
FIG. 9 is a partial perspective view similar to FIG. 4 illustrating the joinder of adjacent duct sections using the corner elements of FIGS. 2 and 3 including using fastener members through the openings associated with the leg portions of the connector elements.

In those applications where additional strength and rigidity are necessary for connecting adjacent duct sections 10, optional holes 40 and 42 can be associated with the leg portions 24 and 26 as illustrated in FIGS. 2, 5 and 9. Again, if the clearance hole 40 and tap hole 42 are utilized in association with the pair of leg portions 24 and 26 as best illustrated in FIG. 2, the positioning of the opposed pair of connector elements 22 within the duct channel flanges 12 as illustrated in FIG. 9 will be such that a clearance opening 40 associated with leg portion 24 of one of the opposed pairs of connector elements 22 will be positioned in alignment with the tap hole 42 associated with leg portion 26 of the other opposed connector element 22.

Often times the duct channel flanges are provided with holes or openings for accomplishing this additional joinder. Such flange holes are typically spaced from the duct section corners a predetermined distance in conformity with the positioning of the additional openings 40 and 42 associated with the present connector elements 22 as well as with other conventional corner or angle plates. Due to manufacturing tolerances, damage to the duct channel flanges during shipping, and other factors, the alignment of duct channel flange openings with the openings 40 and 42 often do not occur. This out-of-alignment situation is overcome by another aspect of the present invention wherein a slot 56 is appropriately positioned in the duct channel flange 12 at a predetermined distance from the duct corner as illustrated in FIG. 5. Use of the slot 56 as compared to a single hole or opening in the duct channel flange substantially eliminates the misalignment issue and allows the respective connector element leg openings 40 and 42 to be properly aligned since the slot 56 is of sufficient length or size to capture both openings 40 and 42 associated with the opposed leg portions of connector elements 22 therewithin thereby eliminating any contact or interference with the duct channel flange. Use of the slots 56 likewise enables a user to move the corner elements 22 even after installation by hammering inward or outward on the respective corner element or the duct wall adjacent thereto so as to move the holes 40 and 42 into alignment with each other when the duct section is out of alignment due to slight size differences or other factors as discussed above.

In similar fashion, a fastening member such as the high-speed fastener 46 is inserted first through the clearance opening 40 associated with one leg portion 26 of the aligned pairs of connector elements 22, then through the aligned slot 56 of the duct channel flange 12, and finally through the tap opening 42 associated with the opposed leg portion 24 of the aligned pair of connector elements 22 so as to complete the connection therebetween. The fastener 46 will bite into the material surrounding the tap hole 42 as previously explained during the fastening process. The width of the slots 56 should be at least as wide as the diameter of the clearance hole 40 for receiving the threaded portion 50 of the fastener 46.

In the particular embodiment illustrated in FIG. 9, at least one fastener 46 is utilized through aligned openings 30 and 32 associated with the corner portion 28 of the opposed pair of connector elements 22 and a fastener 46 is likewise used for each of the two opposing leg portions 24 and 26 associated with the opposed pair of connecting elements 22. As illustrated in FIG. 9, only three fasteners 46 are used for the joinder. It is also recognized that a fourth fastener 46 could likewise be utilized through the corner portions 28 of the opposed pair of connector elements 22 as previously described with respect to FIG. 4. In this situation, there would be four fasteners 46 driven through each pair of connector elements 22 associated with the four corners of the aligned duct sections 10 for additional strength if needed. The precise number of holes and fasteners associated with both the leg portions 24 and 26 and the corner portion 28 of the present connector element 22 may vary and may include additional openings 30 and 32, 40 and 42 without departing from the spirit and scope of the present invention.

As best illustrated in FIGS. 2 and 5, and as explained above, the fastener 46 will generally not bite into the material of the corner element leg portion 26 or the duct channel flange 12 when passing through the clearance hole 40 and slot 56, but will bite into the material of the opposing corner element leg portion 24 around the smaller tap hole 42. In this way, the fastener 46 again uses the opposed leg portions of the corner elements 22 to further clamp together the duct channel flanges 12 of the respective duct sections 10. Of course, the fastener 46 may bite into the duct channel flange 12 because of a slight misalignment of the slot 56 with the openings 40 and 42, and the slot 56 may be made smaller to promote direct inner connection of the fasteners 46 with the duct channel flange 12 while remaining within the scope of the present invention. Nevertheless, the possibility of misalignment of the slots 56 and the corner element leg openings 40 and 42 are greatly reduced since the length of the slots 56 obviate many misalignment scenarios and likewise allow for correction of any slight misalignment issues as previously explained.

Figure 10:
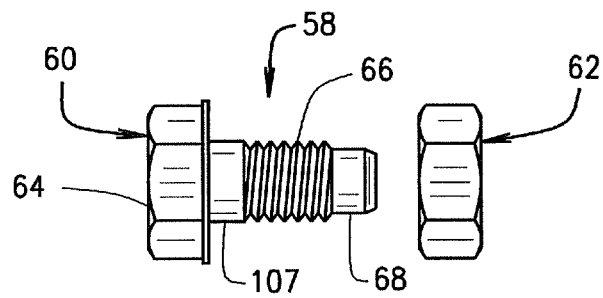
FIG. 10 is a side elevational view of another embodiment of a high speed fastener for use with the present corner elements constructed in accordance with the teachings of the present invention.

Although fastener 46 is preferred because it does not require the use of an additional nut or washer and it is specifically designed for quick and easy insertion with a power drill, another aspect of the present invention is related to the use of fastener 58 illustrated in FIG. 10. Fastener 58 comprises a high-speed piloted bolt 60 in combination with a standard nut 62. The bolt 60 includes a head portion 64, a threaded portion 66, and a piloted portion 68 similar to fastener 46. Like fastener 46, the piloted portion 68 is of a diameter smaller than the threaded portion 66 and is of a diameter smaller than the tap hole 42 associated with leg portion 24 of corner element 22. Bolt 60 will function in the same manner as fastener 46 with respect to engaging the clearance hole 40 and biting into the material surrounding the tap hole 42, and the threaded portion 66 and pilot portion 68 are sized and shaped so as to be compatible with the size and shape of the clearance and tap holes 42 and 40 as discussed above. In addition, the pilot portion 68 of the bolt 60 enables a standard nut such as the nut 62 to be guided into perfect threadable engagement with the threaded portion 66 thereby substantially eliminating mis-threading of the nut 62 onto the bolt 60 as well as substantially eliminating cross-threading/misalignment typically associated with threading a standard nut onto a standard bolt. The use of the piloted portion 68 on bolt 60 again speeds up the connection process; it provides for proper thread engagement between the nut 62 and the threaded portion 66 of bolt 60; and it provides for a high-speed connection through the use of a power drill. The spacing of the holes 30 and 32 associated with the corner portion 28 of the present corner elements 22 are likewise sufficiently spaced so as to allow the fastener 58 to be inserted from opposite sides of an opposed pair of corner elements 22 when positioned for joining adjacent duct sections 10 as previously described with respect to FIG. 4.

Figure 11:
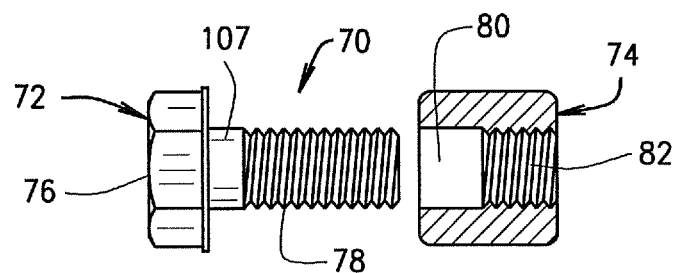
FIG. 11 is a side elevational view of another embodiment of a high speed fastener member for use with the present corner elements constructed in accordance with the teachings of the present invention.

FIG. 11 illustrates still another embodiment 70 of a high-speed fastener member for use with the present corner elements 22, the embodiment 70 including a standard bolt 72 and a piloted nut 74. The standard bolt 72 includes a head portion 76 and a threaded portion 78 and the piloted nut 74 includes a non-threaded cavity 80 and a threaded cavity 82. The non-threaded cavity 80 is of a diameter larger than the threaded portion 78 of bolt 72 and larger than the threaded cavity 82 and extends along a portion of the overall length of the piloted nut 74 as illustrated in FIG. 11. The piloted nut 74 could also be a piloted washered nut. The slightly oversized non-threaded cavity 80 serves as a guide mechanism for properly orienting the threaded portion 78 of the standard bolt 72 into the nut 80 before engaging the threaded cavity 82. Like the piloted portions 52 and 68 associated with fasteners 46 and 58, the non-threaded cavity 82 allows the nut 76 to be properly positioned relative to the threaded portion 78 thereby again substantially eliminating cross-threading and misalignment issues in engaging the nut 74 with the bolt 72. This again provides for a quick, easy, and high-speed connection between the bolt 72 and the nut 74 including connection through the use of a power drill. The nut 74 may also have a flat washer shape attached or otherwise associated with one end portion thereof for use with slotted or rectangular openings.

Use of the fasteners 58 (FIG. 10) and 70 (FIG. 11) are preferred over the uses of standard nuts and bolts in that the piloted portion 68 and non-threaded cavity 80 provide for mating the respective bolts 60 and 72 with their corresponding nuts 62 and 74 in a fast and efficient manner with accurate alignment of the corresponding threads thereby precluding cross-threading and other misalignment issues so that a power tool can be used without the need to start the threading process by hand before using the power tool. All of the fasteners associated with the present invention, namely, fasteners 46, 58 and 70 have advantages as explained above over the use of standard nuts and bolts, sheet metal screws and machine screws which are typically used in connecting adjacent duct sections. Use of the clearance holes 30 and 40 and the tap holes 32 and 42 as discussed above with respect to the present corner element 22 in combination with any of the fastener elements 46, 58 and 70 as explained above greatly improves the speed, accuracy, and overall strength and rigidity of connecting adjacent duct sections.

It should also be noted that the present connector elements 22 do not include any projections or other members which extend transversely relative to the top and bottom surfaces thereof such as the projections associated with the angle plate illustrated in U.S. Pat. No. 5,342,100. As a result, the top and bottom surfaces of the corner elements 22 are relatively smooth; they are easy to handle; they provide no projections or protrusions which can be hazardous to workers when handling the corner elements or which can impede their work efficiency by getting caught in their work gloves or even cutting the worker's hand; they are nestable one on top of the other; and they are stackable in a conventional corner installing machine as illustrated in FIG. 12. In this regard, a plurality of the present corner elements 22 can be stacked and nested in a conventional corner installing machine such as those manufactured by Iowa Processing Industries and/or Lockformer, and the present corner elements 22 are easily slidable from the bottom of a stacked arrangement for use in conventional corner installing machines. In this regard, a center support or riser such as the member 84 illustrated in FIG. 12 can be provided or otherwise associated with a conventional automatic installing machine to provide support to the present corner elements 22 due to their bowed configuration.

In addition, as best illustrated in FIGS. 4 and 9, the width of the present corner elements 22 is such that crimping of the terminal end portion 20 of the duct channel side flange 18 is likewise possible to further strengthen the stability of the overall joinder and to further hold the pair of opposed corner elements 22 in proper position within the duct channel flanges 12 as previously explained. In this regard, the present corner elements 22 are sized and shaped so that no pressing of the corner elements 22 into a respective duct channel flange 12 is required, but the width of the respective leg portions 24 and 26 as best shown in FIGS. 5 and 8 is such that crimping can be easily accomplished. Since the present corner elements 22 do not include upstanding side walls, crimping now requires the bending over of only one metal thickness, namely, the side wall or side flange 18 of the duct channel flange 12 onto the corner leg portions 24 and/or 26 instead of bending over two metal thickness as is true with the angle plate disclosed in U.S. Pat. No. 5,342,100. This requires only one half of the force to accomplish the bending as previously required and it saves time.

Still further, the duct sections 10 can be brought into end-to-end relationship without having any corner flange connection members initially associated with either duct section. The present corner flange connection member 22 could be held manually in registration with the duct channel flanges 12 while any one of the fasteners 46, 58 and/or 70 are driven through the opposed pair of corner elements 22 and/or the duct channel flanges 12. The opposite corner flange connection member could be held in place at the same time until the appropriate fastener had simultaneously completed the task of securing each corner flange connection member 22 to its respective adjacent duct channel flange 12 and thereby securing the duct sections 10 together. No special corner flange connection members or other connection components, or any special equipment including using a conventional corner installing machine is necessary to complete the joinder of adjacent duct sections in accordance with the present invention.

FIG. 13 illustrates another embodiment 86 of the present invention wherein corner element 86 includes a pair of integrally formed leg portions 88 and 90, a corner portion 92 having a pair of spaced apart openings 94 associated therewith and a pair of optional openings 96 associated with the respective leg portions 88 and 90. Corner element 86, like corner element 22, likewise includes a pair of spaced creases or bends 98 and 100 wherein the respective leg portions 88 and 90 are similarly bent or angularly deflected about such creases so as to present the same bowed shaped configuration as previously discussed with respect to corner element 22. Corner element 86 differs from corner element 22 in that the pair of openings 94 associated with corner portion 92 are of the same diameter and the pair of openings 96 associated with the respective leg portions are of the same diameter. In this regard, the diameter of the openings 96 may be of the same diameter as the openings 94, or they may be of a different diameter. In this particular embodiment, joinder of adjacent duct sections 10 and adjacent opposed corner elements 86 can be accomplished through the use of any one of the fasteners 46, 58, 70 and/or a conventional nut and bolt arrangement, the only difference being that the threaded portion associated with any of these fastener members will bite into the material of the opposed corner elements 86 surrounding both pairs of the openings 94 and/or 96 as the fastener is driven through such aligned openings. In this regard, the threaded portion of the fasteners positioned through openings 94 and/or 96 will be compatible with the respective diameters of such openings so as to form a threaded inner connection between the opposed pairs of corner elements 86 as previously explained with respect to corner element 22. Like corner element 22, the bowed configuration of corner element 86 provides the same increased clamping pressure to the duct channel flanges when a pair of duct sections are joined together as previous explained regardless of whether the respective openings 94 are of the same size or of different sizes, and regardless of whether the openings 96 are of the same size or of a different size. Also, as previously discussed, corner portion 92 could likewise form a continuous bend or curve with leg portions 88 and 90 such that corner element 86 is completely bowed.

When using any one of the fasteners 46, 58, 70, or any conventional nut and bolt arrangement to join together opposed connector elements 86 in a tight sealing engagement with one another, it is known in the practice to strip out the threads formed in the opening 94 and/or 96 associated with the first mating corner element 86 in a connected pair of corner elements 86 in order to allow the threaded portion of the fastener member to draw the second mating corner element 86 into tight engagement with the first corner element 86. Once the first opening is stripped, further threading of the fastener through the opening associated with the opposed mating corner element 86 will then draw such mating corner element into tight engagement with the first corner element. This stripping of the threads cut into the first opening is time consuming and inefficient.

In order to improve the joinder process where the aligned openings 94 and/or 96 associated with corner element 86 are of the same diameter, another aspect of the present invention relates to a still further improved high speed connection fastening member 102 illustrated in FIG. 14. The fastener 102 includes a head portion 104, a relief portion 106, a threaded portion 108, and a piloted portion 110. The relief portion 106 is positioned between the head portion 104 and the threaded portion 108 and differs from the unthreaded portions 107 associated with fasteners 46, 58 and 70 in that the relief portion 106 is of a diameter equal to the root diameter of the threaded portion 108. This is not true of portions 107 associated with fasteners 46, 58 and 70 wherein portions 107 are of a diameter equal to the outside diameter of the respective threaded portions 50, 66 and 78. The piloted portion 110 of fastener 102 also includes a beveled tip 112 for guiding and aligning the fastener 102 within a respective opening as previously explained with respect to fasteners 46 and 68. The threaded portion 108 of fastener 102 is sized and dimensioned in accordance with the diameter of the respective openings 94 and/or 96 associated with the corner element 86 through which it will be inserted.

Figure 15A:
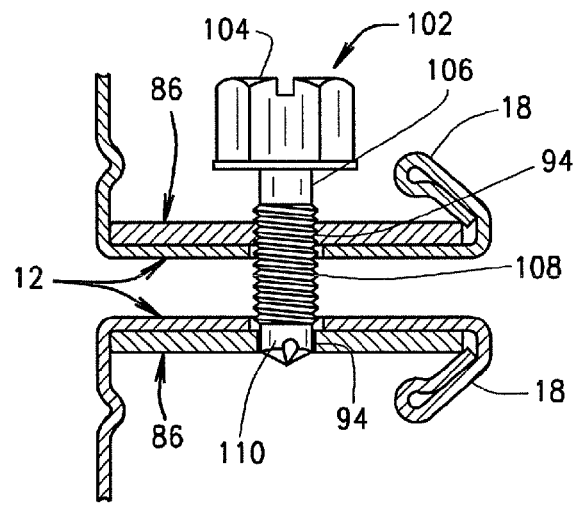
FIGS. 15A-C are side elevational views showing joinder of adjacent duct sections using the corner element of FIG. 13 and the fastener member of FIG. 14.
Figure 15B:
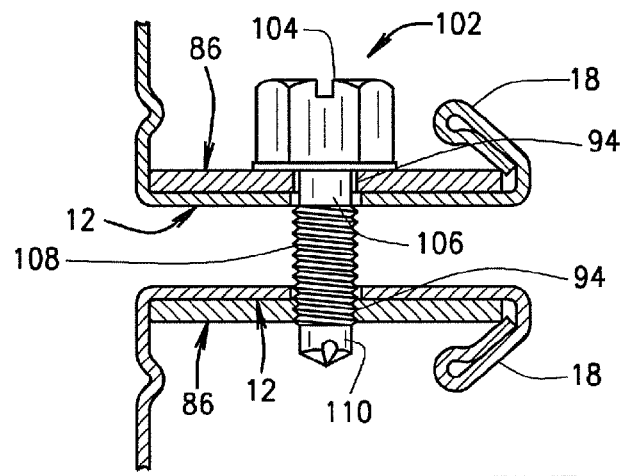
Figure 15C:
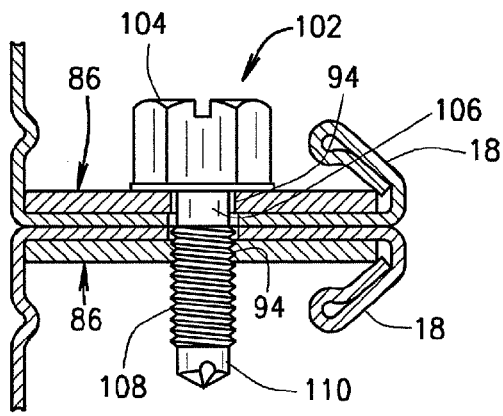

Attachment of an opposed pair of corner elements 86 positioned within adjacent duct channel flanges 12 is best illustrated in FIGS. 15 A-C. In this regard, the fastener 102 is first inserted through the opening 94 associated with the first corner element 86 and threaded portion 108 is threaded through opening 94 until the piloted portion 110 is received within the aligned opening 94 associated with the second mating opposed corner element 86 as best illustrated in FIG. 15A. Since the piloted portion 110 of the fastener 102 has a diameter likewise equal to the root diameter of threaded portion 108, the piloted portion 110 of fastener 102 will register and extend through the corresponding opening 94. The fastener 102 will then continue to thread through both the first opposed corner element 86 and the second opposed corner element 86 until the relief portion 106 of fastener 102 registers with and extends through the opening 94 associated with the first corner element 86 as best illustrated in FIG. 15B. Once the relief portion 106 is in registration with the first opening 94 of the first corner element 86, further threading of the fastener 102 through the aligned opening 94 associated with the second corner element 86 will now begin to draw the second mating corner plate 86 into a tight sealing/abutting relationship with the first opposed corner element 86 through the threading action of the fastener 102 as best illustrated in FIG. 15C.

Since the relief portion 106 has no threads associated therewith, stripping of the opening 94 is not necessary and as soon as the relief portion 106 of fastener 102 registers with the opening 94 associated with the first corner element 86, further driving of the fastener member 102 into the second opposed corner element 86 will draw the second corner element 86 into engagement with the first corner element 86 thereby completing the joinder. Use of the fastener 102 therefore avoids stripping of the threads formed in the first opening 96 and thereby speeds up the entire process. In FIGS. 15A-C, the side walls 18 of each respective duct channel flange 12 are crimped onto the corresponding corner element 86.

Since the corner elements 86 are likewise of a bowed configuration, as the fastener 102 is driven through the respective pair of corner elements 86, the corner portions 92 of the opposed corner elements 86 are likewise drawn together by the action of the fastener 102 thereby exerting an increased clamping or biasing force against the respective duct channel flanges 12 which further serves to form a tight sealing relationship at the joint between the duct sections. Attachment of an additional fastener 102 through the other aligned pair of openings 94 associated with an opposed pair of connector elements 86 will function and operate in a similar fashion as just described.

In those applications where additional strength and rigidity are necessary for connecting adjacent duct sections 10, optional aligned openings 96 associated with the respective leg portions 88 and 90 of the opposed pair of connector elements 86 can likewise be drawn into tight sealing engagement with each other through the use of a fastener member similar to fastener 102. In this regard, the threaded portion of a fastener similar to fastener 102 would be sized and dimensioned so as to be compatible with the diameter of the respective openings 96 so as to draw the duct sections 10 sandwiched therebetween into a tight sealing relationship by the action of the fastener positioned therethrough such as a fastener similar to fastener 102 in a manner as just explained.

It is also recognized that fastener 102 can be utilized in the attachment of opposed pairs of corner elements 22 and relief portion 106 will function identically as the unthreaded portions 107 associated with fasteners 46, 58 and 70 during such joinder.

Figure 16:
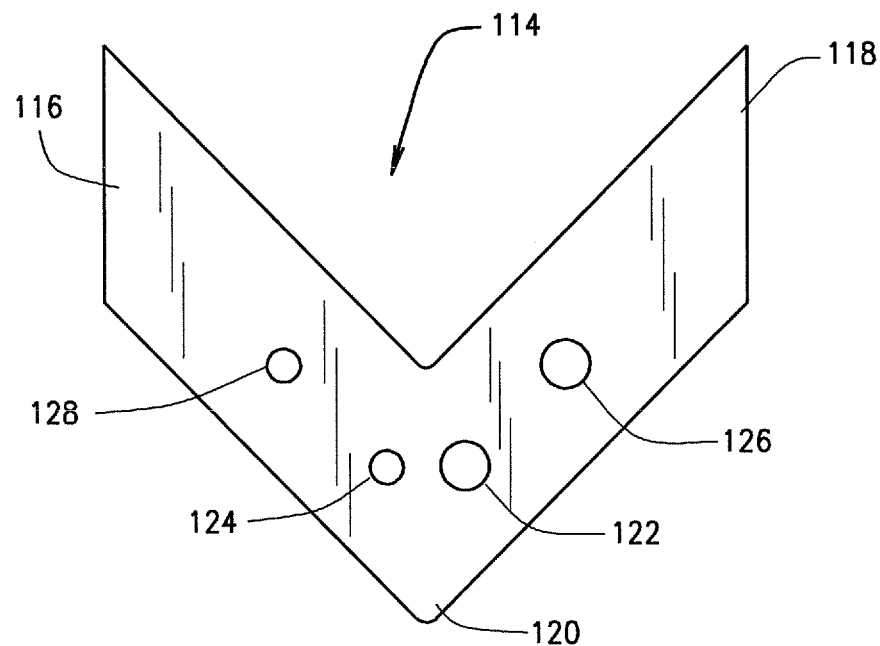
FIG. 16 is another embodiment of the present corner element constructed in accordance with the teachings of the present invention.

FIG. 16 illustrates still another embodiment 114 of the present invention wherein the corner element 114 is again basically L-shaped in configuration and includes a pair of integrally formed leg portions 116 and 118 which are integrally joined together at corner portion 120. Corner element 114 is substantially similar to corner element 22 except that corner element 114 is substantially flat and does not include creases or bends 34 and 36 associated with corner element 22. Instead, leg portions 116 and 118 as well as corner portion 120 all lie in substantially the same plane. However, similar to corner element 22, corner element 114 includes a pair of spaced apart openings 122 and 124, opening 122 being larger in diameter than opening 124, opening 122 being similar to opening 30 and being characterized as a clearance hole while opening 124 is similar to opening 32 and is characterized as being a tap hole.

In similar fashion, the leg portions 116 and 118 of corner element 14 may likewise each include an optional opening 126 and 128 as illustrated in FIG. 16, opening 126 being characterized as a clearance opening and opening 128 being characterized as a tap hole. Openings 126 and 128 associated with corner element 114 are substantially similar to openings 40 and 42 associated with corner element 22. In this regard, the diameters of the clearance holes 122 and 126 and the tap holes 124 and 128 are as previously explained with respect to corner element 22 and use of any one of the fasteners 46, 58, 70, 102, and a conventional nut and bolt arrangement can be utilized as explained above with respect to corner elements 22 and 86 when attaching aligned opposed pairs of corner elements 114 for connecting adjacent end-to-end duct sections 110 as previously explained. Since the corner element 114 is substantially flat, it is possible to orient opposed corner elements 114 in opposed duct channel flanges 12 such that the clearance openings 122 and 126 associated with one of the aligned pair of corner elements 114 is aligned with the clearance opening 122 and 126 associated with the opposed pair of corner elements 114. As a result, care must be taken such that the opposed aligned pairs of corner elements 114 are positioned within their corresponding duct channel flanges 12 such that the clearance openings 122 and 126 of one corner element 114 will be aligned with the tap openings 124 and 128 associated with the other aligned corner element 114. In all other respects, attachment of aligned pairs of corner elements 114 will be substantially similar to that previously described with respect to channel element 22 except that the additional clamping force achieved from the bowed configuration of corner element 22 will not be realized with the substantially flat corner element 114.

Figure 17:
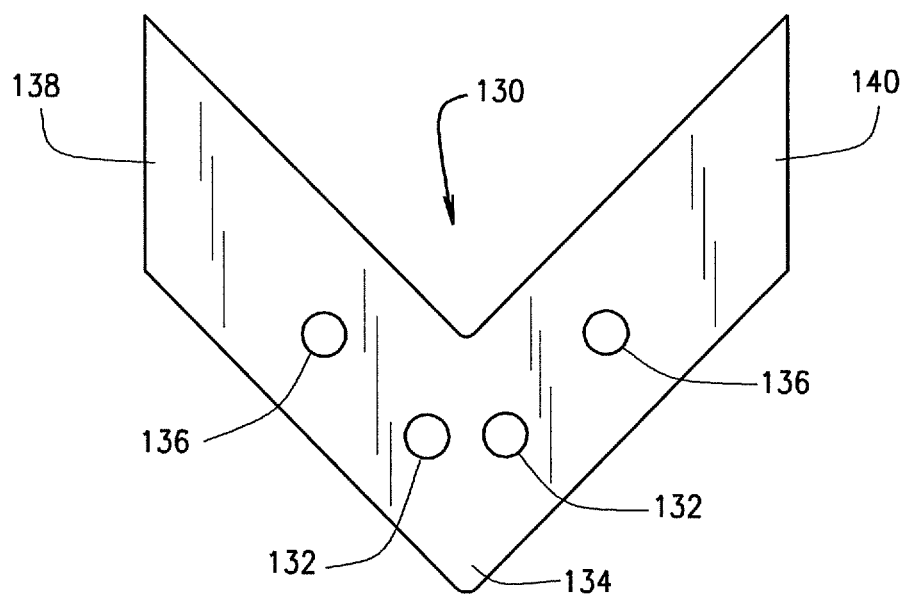
FIG. 17 is still another embodiment of the present corner element constructed in accordance with the teachings of the present invention.

In order to eliminate the possibility of improperly orienting opposed pairs of corner elements 114 as previously explained, the respective corner openings 122 and 124 could be made of the same diameter and the leg openings 126 and 128 could be made of a similar diameter. FIG. 17 therefore illustrates still another embodiment 130 of the present corner element wherein the corner element 130 is substantially similar to corner element 114 except that the openings 132 associated with corner portion 134 are of the same diameter and the openings 136 associated respectively with the leg portions 138 and 140 are of the same diameter. As previously explained with respect to corner element 86, the diameter of the openings 132 may be the same as or different from the diameter of the openings 136. In all other respects, the function and operation of the corner element 130 is substantially identical to the function and operation of the corner element 114 and attachment of an aligned pair of corner elements 130 can be quickly and easily accomplished through the use of the high speed piloted fastener 102 as previously explained with respect to corner element 86. Since the openings 132 and 136 are of similar diameter, corner openings 132 and leg openings 136 associated with one aligned pair of corner elements 130 will always be in registration with similar openings 132 and 136 associated with the other aligned pair of corner elements 130 regardless of the orientation of the corner element 130 when positioned within the corresponding duct channel flange 12. This embodiment eliminates misalignment of the respective aligned openings associated with the corner elements since the diameter of such openings are the same.

Figure 18:
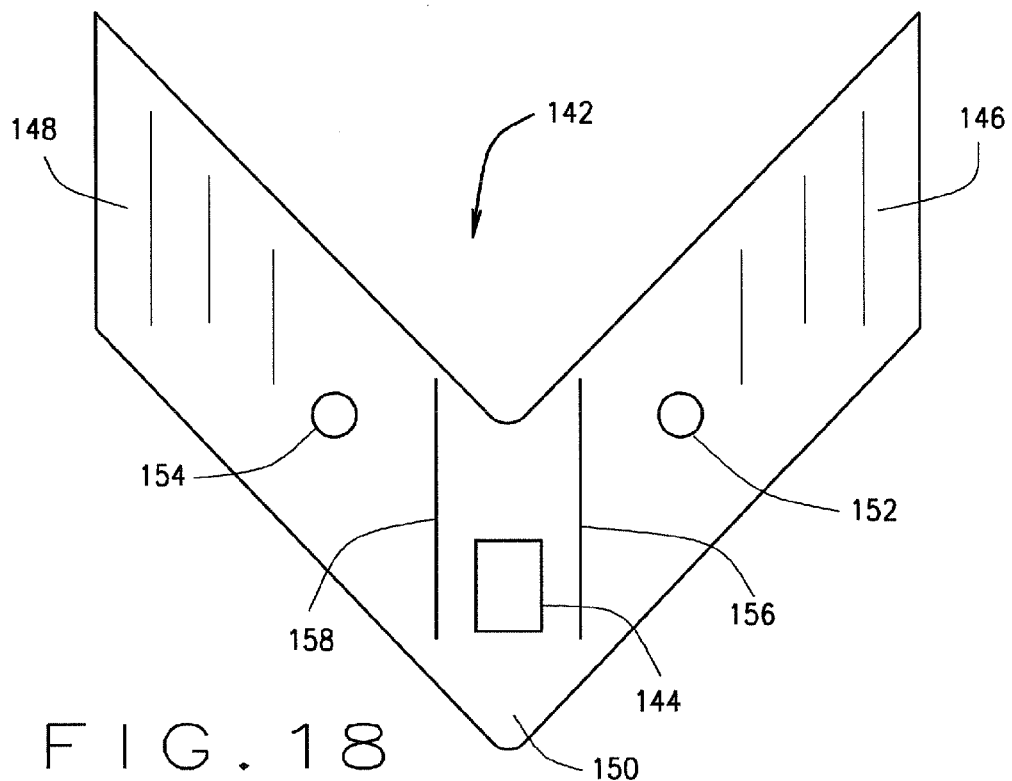
FIG. 18 is still another embodiment of the present corner element constructed in accordance with the teachings of the present invention.

FIG. 18 illustrates still another embodiment 142 on the present invention wherein the corner element 142 is substantially similar to corner element 22 except that the pair of corner openings 30 and 32 have been replaced with a single corner opening 144. Corner opening 144 is substantially rectangular in shape and is adapted to receive a standard carriage bolt typically used in the industry. In all other respects, the corner element 142 is substantially identical to corner element 22 and includes a pair of integrally formed leg portions 146 and 148 which are integrally joined at corner portion 150; a pair of optional leg openings 152 and 154, opening 152 being a clearance opening and opening 154 being a tap opening; and a pair of spaced creases or bends 156 and 158 about which the respective leg portions 146 and 148 are similarly bent or angularly deflected as previously explained so as to present the same bowed shaped configuration previously discussed with respect to corner element 22.

Figure 19:
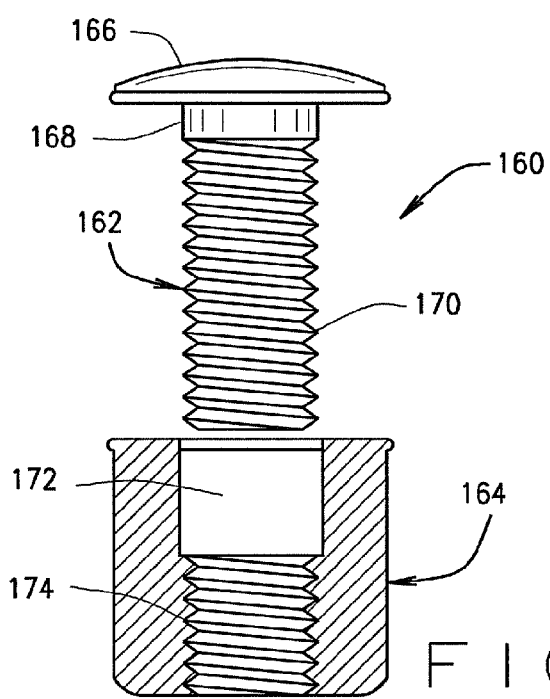
FIG. 19 is still another embodiment of a high speed fastener member for use with the corner element of FIG. 18.

Joinder of adjacent duct sections utilizing adjacent opposed corner elements 142 can be accomplished through the use a conventional carriage type bolt. In this regard, FIG. 19 illustrates still another embodiment 160 of a high-speed fastener member for use with the present corner elements 142, the embodiment 160 including a standard carriage bolt 162 and a piloted nut 164. The standard carriage bolt 162 includes a head portion 166, a rectangularly shaped relief portion 168, and a threaded portion 170. The piloted nut 164 includes a non-threaded cavity 172 and a threaded cavity 174. The non-threaded cavity 172 is of a diameter larger than the threaded portion 170 of carriage bolt 162 and larger than threaded cavity 174 and extends along a portion of the overall length of the piloted nut 164 as illustrated in FIG. 19. Similar to fastener member 70 illustrated in FIG. 11, the slightly oversized non-threaded cavity 172 serves as a guide mechanism for properly orienting the threaded portion 170 of the standard carriage bolt 162 into the nut 164 before engaging the threaded cavity 174. In this regard, the piloted nut 164 functions and operates substantially similar to piloted nut 74 illustrated in FIG. 11, thereby again substantially eliminating cross-threading and misalignment issues in engaging the nut 164 with the carriage bolt 162.

It is also recognized that the piloted nut 164 may also include a flat washer shaped portion attached or otherwise associated with one end portion thereof thereby forming a piloted washered nut for use with slotted or rectangular openings. In this regard, the corner opening 144 associated with corner element 142 may be square instead of rectangular, or it may take on any other shape other than a circular shape, and the relief portion 168 associated with the carriage bolt 162 will have a shape compatible with the shape of the corner opening 144.

Still further, in this regard, the corner element 142 could likewise be a substantially flat corner element similar to the flat shape associated with corner elements 114 and 130. Use of the fastener 160 in conjunction with corner element 142 again provides for a quick, easy, and high-speed connection between the carriage bolt 162 and the nut 164 including performing such connection through the use of a power tool. In addition, use of the clearance hole 152 and the tap hole 154 as discussed above with respect to corner element 22 in combination with any of the fastener elements 46, 58 and 70 as explained above likewise greatly improves the speed, accuracy, and overall strength and rigidity of the connecting adjacent duct sections. High-speed fastener 160 therefore accommodates use of a rectangular or square opening commonly associated with corner elements such as the rectangular opening 144 associated with corner element 142. It is further recognized and anticipated that the carriage bolt 162 could likewise include a piloted portion similar to piloted portion 52 or 68 to further guide the carriage bolt 162 into proper engagement with the nut 164. In this regard, if a piloted end portion is associated with the carriage bolt 162, a conventional nut could be used instead of the piloted nut 164 as previously explained with respect to the high-speed fastener 58.

Figure 20:
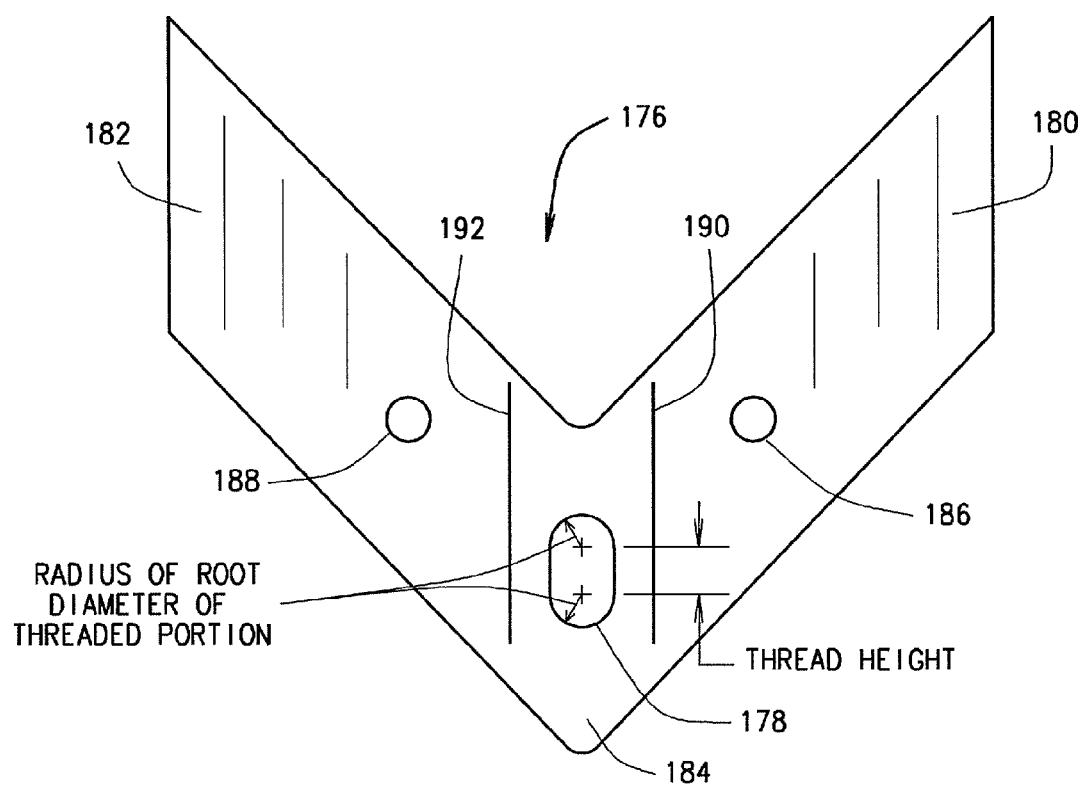
FIG. 20 is still another embodiment of the present corner element constructed in accordance with the teachings of the present invention.
Figure 21:
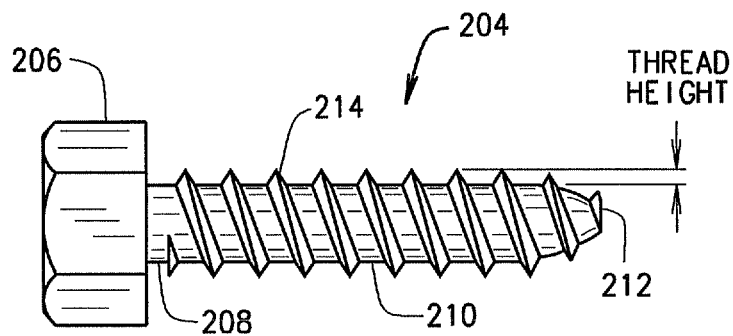
FIG. 21 is still another embodiment of a high speed fastener member for use with the corner element of FIG. 20.
Figure 22:
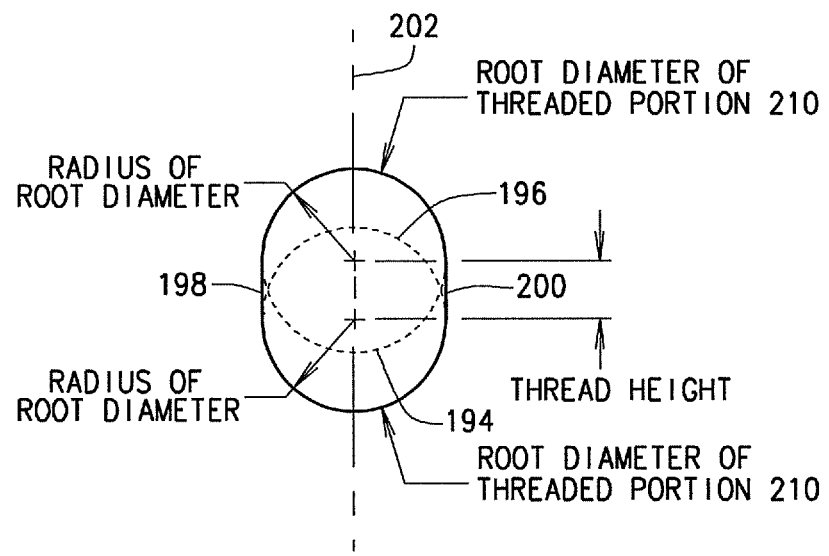
FIG. 22 is an exploded view showing the formation of the corner opening associated with the corner element of FIG. 20.

FIG. 20 illustrates still another embodiment 176 of the present invention wherein the corner element 176 is substantially similar to corner element 142 except that the substantially rectangularly corner opening 144 has been replaced with an oblong opening 178 which is adapted to receive an improved high speed fastening member 204 as best illustrated in FIG. 21. Like corner element 142, corner flange connection member 176 likewise includes a pair of integrally formed leg portions 180 and 182 which are integrally joined at corner portion 184, a pair of optional leg openings 186 and 188, and a pair of spaced creases or bends 190 and 192 about which the respective leg portions 180 and 182 are similarly bent or angularly deflected as previously explained so as to present the same bowed shaped configuration previously discussed with respect to corner element 22. Optional leg openings 186 and 188 can be of the same diameter, or opening 186 can be a clearance opening and opening 188 can be a tap opening as previously explained. The oblong opening 178 extending through the corner portion 184 is derived from overlaying and offsetting two circles equal to the root diameter of the threaded portion 210 associated with fastening member 204 illustrated in FIG. 21. The forming of the opening 178 is best illustrated in FIG. 22 wherein two circles having the root diameter of the threaded portion 210 of fastener 204 are overlaid and offset a distance equal to the thread height of the threads 214 associated with threaded portion 210 as best illustrated in FIGS. 21 and 22. Once the two circles in FIG. 22 are overlaid and offset as explained and illustrated, the inner arc portions 194 and 196 (FIG. 22) are eliminated and substantially tangent lines 198 and 200 are drawn connecting the sides of the two circles thereby forming the oblong opening 178. The lines 198 and 200 do not have to be exact tangent lines but can be approximately tangent and still achieve the desired results. Importantly, the centers associated with the two circles illustrated in FIG. 22 are in alignment with each other and lie on line 202, these centers being offset as previously explained by the height of the threads associated with fastening member 204. The resulting opening 178 is illustrated in FIG. 20 and its arcuate end portions have a radius equal to the radius of the root diameter of threaded portion 210 of fastener 204.

Joinder of adjacent duct sections utilizing adjacent opposed corner flange connection members 176 can be accomplished through the use of fastening member 204 illustrated in FIG. 21. Fastening member 204 is specifically designed for use with corner element 176 and, more particularly, with the opening 178 and includes a head portion 206, a non-threaded spinout area 208, a threaded portion 210 and a blunt or flat terminal end portion 212. The non-threaded spinout area 208 is positioned between head portion 206 and the start of the threaded portion 210 and its length is typically equal to at least the thickness of the corner portion 184 of corner element 176. In addition, the spacing between the threads 214 associated with threaded portion 210 are equal to approximately twice the thickness of the corner portion 184 of corner element 176. These parameters enable the fastening member 204 to be positioned within the opening 178 at a slight angle of insertion such that the outside diameter of the threads 214 on one side of the fastener member 204 clears the opening 178 while the root diameter of the threaded portion 210 associated with the opposite side portion of fastening member 204 clears or abuts the opposite side of opening 178. This enables the fastening member 204 to be inserted within the opening 178 of a first opposed corner element 176 at a slight inclination and thereafter threaded through opening 178 of the first opposed corner element, through corresponding openings associated with the duct channel flange pairs sandwiched therebetween, until the blunt end portion 212 of the fastening member 204 is received within the corresponding opening 178 associated with the second mating opposed corner element 176. The fastener 204 will then continue to be threaded through both the first opposed corner element 176 and the second opposed corner element 176 until the spinout area 208 of fastener 204 registers with and extends through the opening 178 associated with the first corner element 178 as previously explained with respect to fastener 102 illustrated in FIGS. 15A-C. Once the spinout area 208 is in registration with the first opening 178 of the first corner element 176, further threading of the fastener 204 through the aligned opening 178 associated with the second corner element 176 will now begin to draw the second mating corner flange connection member 176 into a tight sealing/abutting relationship with the first opposed corner element 176 through the threading action of the fastener 204. Like fastener 102, use of the fastening member 204 avoids stripping of the threads formed in the first opening 178 and thereby speeds up the entire process. Also, as the fastening member 204 begins to thread itself through the second opening 178 associated with the second corner element 176, the fastening member 204 will straighten itself out and become substantially vertical as the threading operation is completed. The new fastening member 204 includes the same attributes as explained above with respect to fastener 102 but is specifically designed as a sheet metal fastener for use with sheet metal typically used in the HVAC industry.

Since the corner elements 176 are likewise of a bowed configuration, as the fastening member 204 is driven through the respective pair of corner elements 176, the corner portions 184 of the opposed corner elements are likewise drawn together by the action of the fastening member 204 thereby exerting an increased clamping or biasing force against the respective duct channel flanges which further serves to form a tight sealing relationship at the joint between the duct sections. It is also recognized that the corner element 176 could be completely bowed as previously explained and opening 178 could be formed and positioned on bowed corner portion 184 as previously explained. It is further recognized that the corner element 176 could likewise be constructed as a substantially flat member and still function in a conventional manner with fastening member 204 drawing the opposed corner elements 176 into tight engagement with each other.

It is also recognized that the fastener 204 could likewise be utilized with a piloted nut similar in construction to the piloted nut 74 illustrated in FIG. 11 wherein the piloted nut would include a non-threaded cavity and a threaded cavity designed to guide, receive and accept threaded portion 210 of fastener member 204.

Like connector element 22, it should be noted that connector elements 86, 114, 130, 142 and 176 likewise do not include any projections or other members which extend transversely relative to the top and bottom surfaces thereof, and they are likewise stackable and nestable in a conventional corner installing machine as previously explained with respect to corner element 22. Since corner elements 114 and 130 are substantially flat, the use of a center support or riser member such as member 84 illustrated in FIG. 12 will not be necessary.

In similar fashion, as with corner element 22, the width of the corner elements 86, 114, 130, 142 and 176 are likewise such that crimping of the terminal end portion 20 of the duct channel side flange 18 is likewise possible to further strengthen the stability of the overall joinder and to further hold the pair of opposed corner elements in proper position within the duct channel flanges 12 as previously explained.

The present corner flange connection members 22, 86 114, 130, 142 and 176 and the connection systems described herein provide not only substantial strength to the joined duct section corners, but when the openings associated with the leg portions thereof are utilized, it likewise physically joins the adjacent side walls of each duct section 10. The strength arises from the integral connection of the corner elements to the adjacent duct channel flanges at the intersection of the corners of the duct sections 10 by the high-speed fasteners 46, 58, 70, 102, 160 and/or 204 extending through the corner portions of each respective pair of corner elements. More particularly, the unique bowed configuration of the present corner elements 22, 86, 142 and 176 provide for a greater clamping force to the respective duct channel flanges during the fastening process as compared to the known conventional angle plates used in the industry. This spring-type biasing force achieved via the bowed configuration increases the strength and rigidity of the joined duct sections. As a result, a stronger corner-to-corner clamping force is generated through the use of the present corner elements 22, 86, 142 and 176. In addition, through the use of the high-speed fastener members disclosed herein, joinder of an opposed pair of corner elements can be made with just a single fastener member, namely, any one of the fasteners 46, 58, 70, 102, 160 or 204 as opposed to the use of a conventional bolt/washer/nut arrangement typically and commonly used in the industry today. In addition, use of all of the disclosed high-speed fastener members substantially eliminate cross-threading and misalignment of conventional nuts and bolts during the fastening process and all of the fasteners 46, 58, 70, 102, 160 and 204 greatly improve the speed and time necessary to accomplish the connection. In addition, all such high-speed fastener members disclosed herein are adaptable for use with power tools thereby further increasing the speed and efficiency of making such connections as compared to conventional bolt/nut combinations. Still further, the self-aligning features associated with the fasteners 46, 58, 70, 102, 142 and 204 likewise improve the efficiency of the fastening process as compared to the use of conventional bolts and nuts.

Use of the present high-speed fasteners likewise eliminates adjacent duct sections from being fastened out of square or out of alignment due to manufacturing tolerances and shipping deformation. In this regard, use of corresponding slots in the duct channel flanges in combination with the holes associated with the leg portions of the present corner elements likewise allow for duct channel flange size variations without precluding the insertion and tightening of the piloted fastening members 46, 58, 70, 102, 160 and 204. Duct work is actually more often than not made with plus and minus sizes that will not allow any pre-formed holes in the duct flanges to line up accurately from duct flange to duct flange as well as to line up accurately with holes associated with corner or angle plates, all which causes the installer to be required to hand drill an opening through the misaligned holes thus compromising the quality of the connection desired and also increasing the labor involved. Use of the present corner elements as well as the present high-speed fasteners helps to eliminate this problem. In addition, the present corner elements can be easily adjusted to align duct sections that are slightly over or under sized. Since the present corner elements include no protrusions or sharp edges, they can be easily nested and stacked for use in automated corner installing machines.

Sheet metal workers are required to assemble and hang duct work sections for the most part well above the ground floor level in buildings and other structures. The spirit of the present invention allows that process to proceed much easier and faster which minimizes a workers frustration and allows for a more friendly work environment when installing and connecting duct sections together. The use of any one of the present high-speed fastener members and a power tool allows the assembly to be accomplished without use of conventional bolts, nuts and washers thereby bringing the entire installation and joinder operation back into the familiar sheet metal worker's field of expertise.

These and other advantages associated with the present corner elements 22, 86, 114, 130, 142 and 176, the present fasteners 46, 58, 70, 102, 160 and 204, and the various methods for attaching the various corner elements to adjacent duct sections will be readily apparent to a person skilled in the art and other various changes and modifications could be made in the above constructions without departing from the spirit and scope of the present invention.

What is claimed is:

1. A corner flange connection member adapted for joining together adjacent duct channel flanges associated with duct sections, said corner flange connection member comprising two leg portions joined together in an angular relationship by a corner portion, said connection member being substantially flat and including at least one opening for joining duct sections, and at least one fastening member having a threaded portion associated therewith, said at least one opening being formed by overlaying and offsetting two openings about equal to the root diameter of the threaded portion of said at least one fastening member, the offset distance between the centers of the two openings being about equal to the thread height of the threads associated with said at least one fastening member, the sides of said openings being formed by joining each of said side of said offset openings with a respective substantially tangent line.

2. The corner flange connection member defined in claim 1 wherein said at least one fastening member includes a head portion, a non-threaded spinout portion, a threaded portion, a threaded piloting lead in portion, and a blunt terminal end portion, said spinout portion being positioned between said head portion and said threaded portion and being of a length about equal to at least the thickness of said corner portion.

3. The corner flange connection member defined in claim 1 wherein spacing between adjacent threads of the fastening member is about equal to approximately twice a thickness of said corner portion.

4. The corner flange connection member defined in claim 1 wherein at least one of said leg portions includes at least one bend.

5. A corner flange connection member adapted for joining together adjacent duct channel flanges of duct sections, said corner flange connection member comprising two leg portions joined together in an angular relationship by a corner portion, said connection member being substantially flat and including at least one opening therethrough for joining the duct sections, and at least one fastening member having a threaded portion, the threaded portion having a root diameter, said at least one opening being defined by two joined and offset partially rounded openings, at least one of the offset partially rounded openings having a sectional extent between opposite sides thereof about equal to the root diameter of the threaded portion of said at least one fastening member, the offset of the two openings being about equal to a thread height of threads of the threaded portion of the fastening member, and the sides of said offset openings being joined generally tangentially.

6. The corner flange connection member defined in claim 5 wherein said at least one fastening member includes a head portion, a non-threaded spinout portion, the threaded portion, a threaded piloting lead in portion, and a blunt terminal end portion, said spinout portion being positioned between said head portion and said threaded portion and being of a length about equal to at least a thickness of said corner portion.

7. The corner flange connection member defined in claim 6 wherein a spacing between adjacent threads of the threaded portion of at least one fastening member is about equal to approximately twice the thickness of said corner portion.

8. The corner flange connection member defined in claim 5 wherein at least one of said leg portions includes at least one bend.

* * * * *